United States Patent
Flothmann et al.

(10) Patent No.: US 10,308,187 B2
(45) Date of Patent: Jun. 4, 2019

(54) STORAGE COMPARTMENT COMPRISING A ROLL TOP

(71) Applicant: fischer automotive systems GmbH & Co. KG, Horb a.N. (DE)

(72) Inventors: Jörg Flothmann, Bondorf (DE); Gunter Leopold, Baiersbronn (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 141 days.

(21) Appl. No.: 15/628,806

(22) Filed: Jun. 21, 2017

(65) Prior Publication Data
US 2017/0368997 A1    Dec. 28, 2017

(30) Foreign Application Priority Data
Jun. 22, 2016  (DE) .................. 10 2016 111 456

(51) Int. Cl.
B60R 7/04       (2006.01)
B60R 11/00      (2006.01)
E05F 15/60      (2015.01)

(52) U.S. Cl.
CPC ............. B60R 7/04 (2013.01); E05F 15/60 (2015.01); B60R 2011/0094 (2013.01)

(58) Field of Classification Search
CPC ..... B60R 7/04; B60R 2011/0094; E05F 15/60
USPC .......... 220/345.1–345.6, 348–351; 224/483; 296/37.8
See application file for complete search history.

(56) References Cited

U.S. PATENT DOCUMENTS

| | | | | |
|---|---|---|---|---|
| 4,854,632 A | * | 8/1989 | Kreuze | B60R 7/06 296/37.12 |
| 7,475,954 B1 | * | 1/2009 | Latunski | B60R 11/00 296/24.34 |
| 2011/0062201 A1 | * | 3/2011 | Lee | B60N 3/101 224/567 |
| 2018/0002977 A1 | * | 1/2018 | Luber | B60R 7/04 |

FOREIGN PATENT DOCUMENTS

DE    10 2014 018 346 A1    6/2015

OTHER PUBLICATIONS

German Search Report dated Mar. 23, 2017 for German Application No. 10 2016 111 459.6.

* cited by examiner

Primary Examiner — James N Smalley
(74) Attorney, Agent, or Firm — Renner Otto Boisselle & Sklar, LLP

(57) ABSTRACT

A storage compartment including a roll top, which is trapezoidal from the front, and pivotable panels disposed next to the roll top. The panels are driven mechanically by way of radial cams, which are rotationally fixed to drive wheels around which the roll top runs.

9 Claims, 2 Drawing Sheets

STORAGE COMPARTMENT COMPRISING A ROLL TOP

CROSS-REFERENCE TO RELATED APPLICATION

The present application claims priority under 35 USC § 119 to German Patent Application No. 10 2016 111 456.1 filed on Jun. 22, 2016, the entire disclosure of which is incorporated herein by reference.

TECHNICAL FIELD

The present disclosure relates to a storage compartment comprising a roll top. The storage compartment is intended for installation in a center console of a motor vehicle for inserting and storing objects, but is not limited to this use.

DESCRIPTION OF THE RELATED ART

Unexamined patent application DE 10 2014 018 346 A1 discloses a box-shaped storage compartment for a motor vehicle. The storage compartment comprises an interior space for inserting and storing objects, and in an intended installation position of the storage compartment, the interior space is open at the top and can be covered by way of a roll top. The roll top is guided by way of a slide guidance mechanism so as to be movable back and forth between a closed position, in which this covers the interior space of the storage compartment so that objects present in the interior space cannot fall out, and an open position. In the open position, the interior space of the storage compartment is accessible allowing objects to be inserted and removed. From the closed position, the roll top of the known storage compartment is guided so as to move in a curve around one end of the storage compartment into the open position.

From the front, the roll top of the known storage compartment is trapezoidal, which is to say the width thereof changes along the length thereof. So as to cover gaps on sides of the roll top when the roll top is closed, the known storage compartment comprises a strip-shaped panel on each side, the panel being pivotable transversely to a movement direction of the roll top. The panel is pressed against longitudinal edges of the roll top by way of a spring element so as to be seated against the sides of the trapezoidal roll top when this is being opened and closed.

SUMMARY

An object herein is an alternative gap covering on a storage compartment next to a roll top having a width that changes along the length.

This object is achieved by a storage compartment having the features described herein. The storage compartment comprises an interior space for inserting and storing objects, which can be covered by way of a roll top, wherein covering shall be understood within the meaning of closing an opening or an open side of the interior space. The roll top is a planar structure, which is bendable in a roll top-like manner perpendicularly to a movement direction and perpendicularly to the surface area thereof. The storage compartment comprises a slide guidance mechanism for the roll top, which guides the roll top movably between a closed position, in which this covers the interior space of the storage compartment, and an open position, in which this exposes the interior space. In the open position, the roll top exposes an opening or an open side of the interior space of the storage compartment, so that the interior space of the storage compartment is accessible so as to insert and remove objects.

The roll top of the storage compartment has a width that changes along a length of the roll top, and in particular it is trapezoidal from the front. The length is a dimension of the roll top in the movement direction thereof, and the width is a dimension transverse to the length in the surface area thereof (not perpendicularly to the surface area thereof!). Due to the changing width along the length of the roll top, a side edge of the roll top is displaced, or the side edges of the roll top are displaced, when the roll top is being opened and closed. This refers to an ostensible shift of the side edge of the roll top during a movement of the roll top transverse to the movement direction of the roll top, considered at a stationary location of the storage compartment. The roll top comprises a panel that is disposed on one side of the roll top so as to shift transversely to the movement direction of the roll top, so that the panel is able to shift in keeping with a lateral displacement of the associated side edge of the roll top during a movement of the roll top. One or more drive means are provided for transmitting a mechanical movement between the roll top and the panel. During a movement of the roll top, the drive means shifts, or shift, the panel transversely to the roll top, so that the panel shifts in keeping with the lateral displacement of the associated side edge of the roll top during the movement of the roll top. During the displacement of the roll top, the panel can be seated against the side edge of the roll top or have a gap with respect to the side edge, the width of which does not change, or changes only little, during the movement of the roll top. The storage compartment preferably comprises such panels on both sides of the roll top.

One embodiment provides for the roll top to be guided in a form-locked manner across a circumference of a drive wheel, which shifts the panel by way of a radial cam, in the manner of a chain drive. The roll top can be guided tangentially along the drive wheel or in the manner of a circular arc on a portion of a circumference of the drive wheel around the drive wheel. The form fit between the roll top and the drive wheel ensures that the roll top and the drive wheel, when shifting, are always located in clearly associated positions with respect to one another. This is essential for shifting of the panel in keeping with the lateral displacement of the associated side edge of the roll top during the movement of the roll top. The radial cam can be rigidly connected to the drive wheel, or the radial cam, or a control element moved by the radial cam, can be driven by the drive wheel. The list is not exhaustive, but exemplary. The drive wheel and the radial cam form, or are included in, a part of the one or more drive means.

The roll top can be manually movable, and it drives the drive wheel and shifts the panel on the side of the roll top by way of the drive wheel and the radial cam. One embodiment provides a drive system for the drive wheel. The drive system is, in particular, an electromechanical system using an electric motor. The drive system of the drive wheel moves the roll top and shifts the panel on the side of the roll top.

One embodiment provides for the panel to be disposed transversely to the roll top. Here, transversely shall be understood to mean an arrangement of the panel perpendicularly to the surface area of the roll top. The panel may also be disposed obliquely with respect to the perpendicular.

One embodiment provides for the panel to be disposed on, or near, a rear end of the interior space of the storage compartment in an opening direction of the roll top.

One embodiment provides for a rear end of the storage compartment in an opening direction of the roll top to be located beneath a covering. During opening, the roll top (substantially) "disappears" beneath the covering. The panel is disposed beneath an edge of the covering on the storage compartment side, which is to say on a side of the covering where the roll top will be beneath the covering. The panel prevents small objects from finding their way beneath the covering next to the roll top.

One embodiment provides for a pivot mounting of the panel so as to guide the same so as to be shiftable transversely to the movement direction of the roll top. A pivot axis of the panel, which can be located inside or outside the panel or can intersect with the panel, extends perpendicularly to a tangential surface of the roll top at the location at which the panel, or the pivot axis thereof, is located. A pivot axis that is obliquely at an acute angle with respect to the perpendicular shall be considered to mean approximately perpendicular in one embodiment.

The roll top can be a single-piece, planar structure, which is bendable about a bending axis parallel to the surface area thereof. Roll tops composed of individual parts are likewise possible. One embodiment provides for the roll top to comprise lamellae, which are pivotably connected to one another in the manner of the links of a chain movable in one dimension. The lamellae can be pivotably connected to one another by way of one or more bands or by way of joints, hinges or the like. Pivot axes of the lamellae extend in, or parallel to, the surface area of the roll top and transversely to the movement direction, or in the direction of the width of the roll top, and angular deviations of the pivot axes are not precluded.

BRIEF DESCRIPTION OF THE DRAWINGS

The storage compartment will be described hereafter in greater detail based on one exemplary embodiment shown in the drawings. In the drawings.

Figure 1:
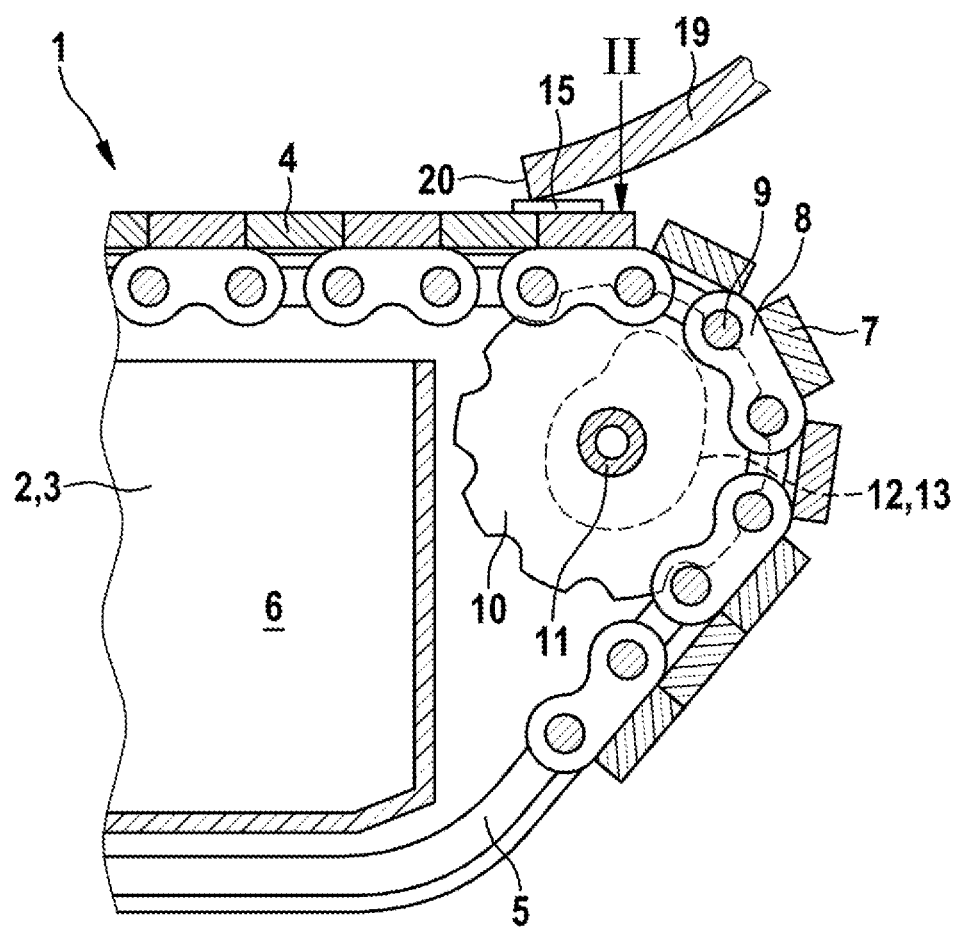
FIG. 1 shows a cut-away drawing of a longitudinal section of a storage compartment in the region of a deflection of a roll top.

The drawing is a simplified and schematic illustration to describe, and provide an understanding of, the invention.

DETAILED DESCRIPTION OF THE INVENTION

The storage compartment 1 shown in FIG. 1 is intended for installation in a center console (not shown) of a motor vehicle (not shown). This comprises a box-shaped housing 2, which is open toward the top when installed as intended. An interior space 3 of the housing 2 is used to insert and store objects.

The storage compartment 1 comprises a roll top 4, which, when closed, covers an open top side of the interior space 3 so that objects present in the interior space 3 cannot fall out. When open, the roll top 4 exposes the open top side of the interior space 3 of the storage compartment 1, so that objects can be inserted into the interior space 3 and removed from the interior space 3. The storage compartment 1 comprises a slide guidance mechanism 5 for the roll top 4, by way of which the roll top 4 is guided so as to be movable back and forth between the closed position and the open position. The storage compartment 1 comprises two grooves, which are congruent seen in a side view, in mutually facing inner sides of two side walls 6 of the storage compartment 1, which serve as the slide guidance mechanism 5. The grooves forming the slide guidance mechanism 5 initially extend along the open top side of the interior space 3, and then in the manner of a circular arc around the outside of an end face of the storage compartment 1, and then continue downward toward a bottom side of the storage compartment 1. The side walls 6 protrude beyond the interior space 3 at the top on the end face of the storage compartment 1, and at the bottom. The side walls 6 are parallel to one another, so that the two grooves forming the slide guidance mechanism 5 are located in planes parallel to one another.

The roll top 4 comprises strip-shaped lamellae 7, which extend transversely across the side walls 6. From the front, the roll top 4 is trapezoidal, which is to say the lamellae 7 become wider in a longitudinal direction of the roll top 4, which is also a movement direction of the roll top 4. Considered at a fixed point of the side walls 6, the side walls of the roll top 4 are thus displaced laterally during a movement of the roll top 4. The lamellae 7 are disposed on link plates 8, which are pivotably connected to one another in the manner of links of a chain movable in one dimension by way of shafts 9. The shafts 9 extend transversely between the side walls 6, and the ends thereof engage in the grooves in the inner sides of the side walls 6 forming the slide guidance mechanism 5 for the roll top 4. The lamellae 7 of the roll top 4 are, or the roll top 4 is, guided so as to move along the slide guidance mechanism 5 by way of the ends of the shafts 9 engaging in the grooves.

Outside the end face of the interior space 3 of the storage compartment 1, where the grooves that form the slide guidance mechanism 5 extend in a circular arc around the end face, drive wheels 10 are disposed on the inner sides of the side walls 6 of the storage compartment 1. The drive wheels 10 are non-rotatably connected to one another by way of a shaft 11, which is rotatably mounted in bearing holes 21 (FIG. 2) in the side walls 6 of the storage compartment 1. A rotational axis of the shaft 11 and of the drive wheels 10 extends transversely to the storage compartment 1 in a center of the circular arcs of the grooves forming the slide guidance mechanism 5. The drive wheels 10 are designed in the manner of sprockets around which the roll top 4, or the lamellae 7 of the roll top 4, run together with the shafts 9. Due to the form fitting of the shafts 9 of the roll top 4 with drive wheels 10 designed in the manner of sprockets, a clear assignment is achieved between a rotational position of the drive wheels 10 and the lamellae 7 of the roll top 4 during movement of the roll top 4 and rotation of the drive wheels 10. The roll top 4 can be manually movable, and, during movement, rotatably drives the drive wheels 10; or the drive wheels 10 can be rotatably driven, for example at the shaft 11 thereof, using an electric motor (not shown), so as to move the roll top 4.

Figure 2:
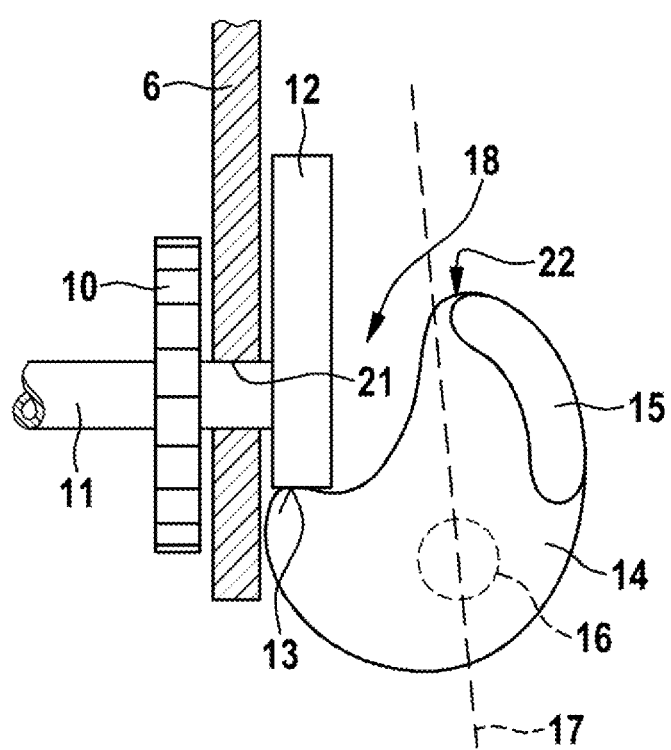
FIG. 2 shows a drive means of the storage compartment according to arrow II of FIG. 1.

On the outer sides of the side walls 6 of the storage compartment 1, the shaft 11 of the drive wheels 10 has control cams 12, which are rotationally fixed to the shaft 11, and thus to the drive wheels 10, the edges thereof forming helical radial cams 13, which in FIG. 1 are shown by dashed lines. Control elements 14 of panels 15, which are disposed on both sides of the storage compartment 1 next to the roll top 4, are seated against the radial cams 13. The panels 15 are mounted pivotably on the outer sides of the side walls 6 of the storage compartment 1 by way of bearing pins 16. One of the respective two control cams 12, control elements 14 and panels 15 is shown in FIG. 2. Pivot axes of the panels 15 extend perpendicularly to a movement direction of the roll top 4 and to a tangential surface of the roll top 4 in the region of the panels 15. The control elements 14 protrude eccentrically to the pivot axes and are held against the radial cams 13 by way of spring elements (not shown). During movement of the roll top 4 and rotation of the drive wheels 10, the control cams 12 follow the rotation and, by way of the radial cams 13 thereof via the control elements 14, pivot the panels 15, which are likewise disposed eccentrically to the pivot axes thereof.

As a result of the pivoting, the panels 15 shift transversely to the roll top 4 and to the movement direction of the roll top 4, so that the panels 15 move in the movement direction in keeping with a change in width of the roll top 4, or of the lamellae 7 thereof. During a movement of the roll top 4, a such at a gap 22 having an at least approximately constant width is achieved between longitudinal sides 17 of the roll top 4, which is trapezoidal from the front, or ends of the lamellae 7 of the roll top 4, and the panels 15; or it is achieved that the panels 15 are seated against the longitudinal sides 17 of the roll top 4, or at the ends of the lamellae 7 of the roll top 4. A longitudinal side 17 of the roll top 4 is shown by a dashed line in FIG. 2. A corresponding shape of the radial cams 13 also allows such a gap having a consistent width to be achieved between the panels 15 and the longitudinal sides 17 of the roll top 4, for example, in the case of curved or undulated longitudinal sides 17 of the roll top 4.

The control cams 12 together with the radial cams 13, which are rotationally fixed to the drive wheels 10, and the control elements 14 projecting from the panels 15 and seated against the radial cams 13 can also be interpreted as drive means 18 for transmitting a mechanical movement between the roll top 4 and the panels 15.

The panels 15 are disposed close to a rear end of the interior space 3 of the storage compartment 1 in an opening direction of the roll top 4 and transversely to the roll top 4, which is to say perpendicularly to a tangential plane of the roll top 4 in a location at which the panels 15 are located.

A rear end of the storage compartment 1 in the opening direction of the roll top 4 is located beneath a covering 19, which extends, for example, in the center of an instrument panel (not shown) of a motor vehicle, downward with respect to a center console (also not shown) of a motor vehicle. The panels 15 are disposed beneath an edge 20 of the covering 19 on the storage compartment side.

Although the device has been shown and described with respect to certain embodiments, it is obvious that equivalents and modifications will occur to others skilled in the art upon the reading and understanding of the specification. The device includes all such equivalents and modifications, and is limited only by the scope of the following claims.

LIST OF REFERENCE NUMERALS 1 storage compartment
2 housing
3 interior space
4 roll top
5 slide guidance mechanism
6 side wall
7 lamella
8 link plate
9 shaft of the lamellae 7
10 drive wheel
11 shaft of the drive wheels 10
12 control cam
13 radial cams
14 control element
15 panel
16 bearing pin
17 longitudinal side
18 drive means
19 covering
20 edge
21 bearing hole
22 gap

The invention claimed is:

1. A storage compartment, comprising an interior space for inserting and storing objects, a roll top for covering the interior space having a width that changes in a longitudinal direction of the roll top, a slide guidance mechanism by way of which the roll top is guided so as to move back and forth between a closed position covering the interior space of the storage compartment and an open position exposing the interior space, and a panel that is disposed on one side of the roll top so as to shift transversely to a movement direction of the roll top, wherein the storage compartment comprises drive means for transmitting a mechanical movement between the roll top and the panel so that the panel shifts transversely to the roll top in keeping with a change in width of the roll top during a movement of the roll top.

2. The storage compartment according to claim 1, wherein the roll top is trapezoidal in shape.

3. The storage compartment according to claim 1, wherein the roll top is guided by a chain drive across a circumference of a drive wheel, which moves the panel by way of a radial cam.

4. The storage compartment according to claim 3, wherein the storage compartment comprises a drive system for the drive wheel.

5. A storage compartment according to claim 1, wherein the panel is disposed transversely to the roll top.

6. A storage compartment according to claim 1, wherein the panel is disposed at a rear end of the interior space of the storage compartment, in an opening direction of the roll top.

7. A storage compartment according to claim 1, wherein a rear end of the storage compartment, in an opening direction of the roll top, is disposed beneath a covering, and the panel is disposed beneath an edge of the covering on the storage compartment side.

8. A storage compartment according to claim 1, wherein the panel can be pivoted about a pivot axis that is perpendicular to the movement direction and to a surface area of the roll top in the closed position.

9. A storage compartment according to claim 1, wherein the roll top comprises lamellae, which are pivotably connected to one another in the manner of a chain movable in one dimension.

* * * * *